Jan. 9, 1923. 1,441,631.
C. J. REESE.
WINDSHIELD HANDLE ASSEMBLY.
FILED APR. 17, 1922.

Inventor
By Curtis J. Reese
Stuart C. Barnes, Attorney

Patented Jan. 9, 1923.

1,441,631

UNITED STATES PATENT OFFICE.

CURTIS J. REESE, OF DETROIT, MICHIGAN, ASSIGNOR TO TERNSTEDT MANUFACTURING CO., OF DETROIT, MICHIGAN, A CORPORATION OF MICHIGAN.

WINDSHIELD HANDLE ASSEMBLY.

Application filed April 17, 1922. Serial No. 553,875.

*To all whom it may concern:*

Be it known that I, CURTIS J. REESE, a citizen of the United States, residing at Detroit, in the county of Wayne and State of Michigan, have invented certain new and useful Improvements in Windshield Handle Assemblies, of which the following is a specification.

This invention relates to windshields and has for its purpose a fastening and locking arrangement for securing the handles to the windshield frame.

It is the object of the invention to provide a cheap but efficient way of securing the handles removably to the windshield tube without having fastening devices running through the opposite side of the tube where they are unsightly.

Figure 1:
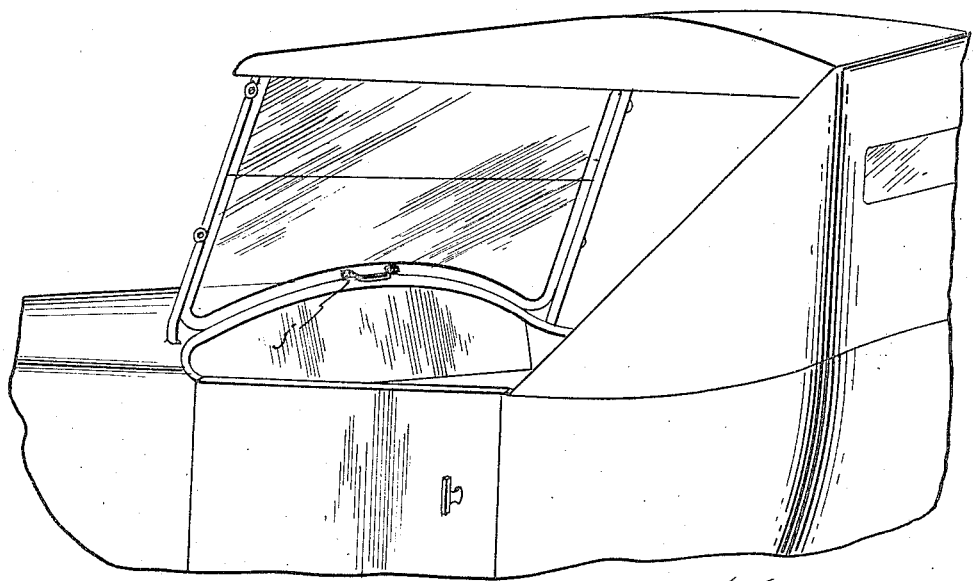
Fig. 1 is a perspective view of a car showing the handle attached to the lower panel.
Figure 2:
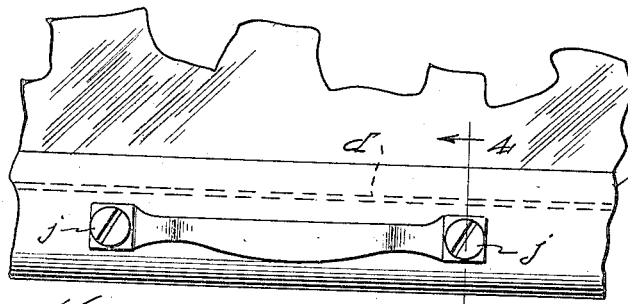
Fig. 2 is a fragmentary elevation of the lower panel showing the handle in place.
Figure 4:
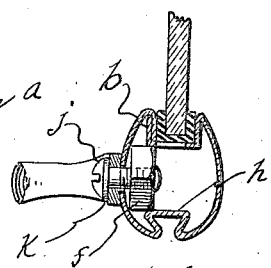
Fig. 4 is a cross section taken on line 4—4 of Fig. 2.
Figure 3:
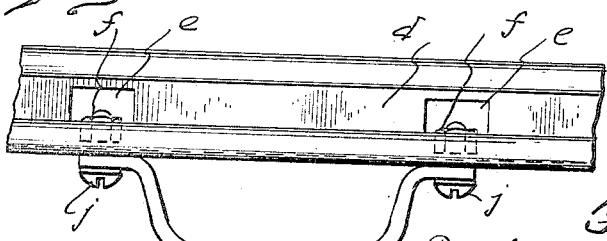
Fig. 3 is a fragmentary plan view of the handle and the tube.

$a$ designates the tubing which is preferably oval shape in cross section—a common form of tubing now in use. Before the glass is assembled into the glass retaining channel $d$, slots $e$ are punched in the bottom of the glass retaining channel; through these are inserted the hexagonal nuts $f$. In practice it is found advisable to use a special fixture to hold these nuts. They are inserted in place and supported under the edge of the glass retaining channel sidewall and just above the weather strip retaining groove $h$. Either of these channel walls or both of them form a lock to prevent the nut turning when the screw $j$ is turned. Hence as soon as the threads of the screw take hold of the nut these adjoining parts hold the nut the same as a wrench would to prevent its turning. The spring washers $k$ are used to prevent the screws from coming loose.

It is obvious that this is a simple way of concealing a removable, detachable connection for the handle with the tube. No blocks or plugs are required but simple nuts which do not have to be manufactured specially for the job.

What I claim is:

1. A handle assembly for a windshield, comprising a windshield tube having a glass retaining channel provided with a slot and a nut let into the interior of the tube through said slot, a handle screw passing through the end of the handle and into the nut and means for holding the nut in a non-rotatable relation.

2. A handle assembly for a windshield, comprising a handle, a channeled tube provided with a slot in the bottom of the channel and a nut let into the slot and engaging in and against the bottom of the channel to hold it in a non-rotatable relation and a screw passing through the end of the handle and into the nut for securing the handle to the tube.

3. A handle assembly for a windshield, comprising a tube provided with a glass retaining channel and having a pair of slots in the glass retaining channel, nuts let into the said slots and retained against adjacent portions of the tube in a non-rotatable relation, a handle, and screws passing through the ends of the handle and into the nuts.

4. A handle assembly for a windshield, comprising a tube provided with a glass retaining channel and having a pair of slots in the glass retaining channel, nuts let into the said slots and engaging with the side portion of said tube in a non-rotatable relation, a handle, and screws passing through the ends of the handle and into the nuts.

In testimony whereof I affix my signature.

CURTIS J. REESE.